(12) United States Patent
Klassen et al.

(10) Patent No.: US 8,353,050 B2
(45) Date of Patent: Jan. 8, 2013

(54) MOBILE DEVICE MANAGEMENT

(75) Inventors: Gerhard Dietrich Klassen, Waterloo (CA); Harry Richmond Major, Waterloo (CA); Alain Rene Gagne, Cambridge (CA); Karen Jean Creditor, Waterloo (CA); Jesse J. Boudreau, Kanata (CA)

(73) Assignee: Research In Motion Limited, Waterloo (CA)

( * ) Notice: Subject to any disclaimer, the term of this patent is extended or adjusted under 35 U.S.C. 154(b) by 434 days.

(21) Appl. No.: 12/552,836

(22) Filed: Sep. 2, 2009
(Under 37 CFR 1.47)

(65) Prior Publication Data
US 2011/0055546 A1 Mar. 3, 2011

(51) Int. Cl.
G06F 21/00 (2006.01)
H04M 15/12 (2006.01)
(52) U.S. Cl. .......................... 726/27; 455/405; 380/255
(58) Field of Classification Search .................. 726/1, 2; 713/168–171; 380/255, 270
See application file for complete search history.

(56) References Cited

U.S. PATENT DOCUMENTS

| 7,197,321 | B2 | 3/2007 | Erskine et al. |
| 7,290,132 | B2 | 10/2007 | Aboba et al. |
| 7,302,272 | B2 | 11/2007 | Ackley |
| 2003/0005329 | A1* | 1/2003 | Ikonen .......................... 713/201 |
| 2005/0250472 | A1 | 11/2005 | Silvester et al. |
| 2008/0292101 | A1* | 11/2008 | Macchi .......................... 380/270 |
| 2009/0136035 | A1 | 5/2009 | Lee |
| 2009/0298469 | A1* | 12/2009 | Kim et al. ...................... 455/411 |
| 2010/0330961 | A1* | 12/2010 | Rogel ............................ 455/411 |

FOREIGN PATENT DOCUMENTS
EP 1845692 10/2007

OTHER PUBLICATIONS

Anonymous, Web site lets parents monitor teens' cell phone use, Online forum posting, posted Sep. 4, 2007, http://www.broadbandreports.com/forurn/r19007350-web-site-lets-parents-monitor-teens-cell-phone-use.
Stefanie Olsen, Software lets parents monitor kids' calls, Article, Jul. 10, 2007, http://news.cnet.com/software-lets-parents-monitor-kinds-calls/2009-1025_3-6195666.html.
Mobile-Spy Home Page, http://www.mobile-spy.com/, Accessed Nov. 24, 2009.

(Continued)

Primary Examiner — Gilberto Barron, Jr.
Assistant Examiner — Malcolm Cribbs
(74) Attorney, Agent, or Firm — Riodout & Maybee LLP

(57) ABSTRACT

A device management method, is disclosed in which available features on a slave mobile device are managed (monitored or controlled) by a slave manager module commanded by a master device through secure messages exchanged between the two devices using respective electronic messaging capabilities on the two devices. Selection of the features of the slave mobile device to be controlled or monitored is facilitated on the master device through a master manager module resident thereon. The features that are controlled or monitored may comprise any user-accessible feature incorporated or installed on the slave mobile device and user access to the feature may be prevented according to at least one criterion, such as: date of use, time of day of use, number of times of use, originator and recipient. User access to the feature may be prevented access to the user-accessible feature when usage limitations for the feature have been reached.

11 Claims, 6 Drawing Sheets

OTHER PUBLICATIONS

My Mobile Watchdog company "Product Features" web page, http://www.mymobilewatchdog.com/features.shtml, Accessed Nov. 24, 2009.

SPEKE (Cryptography), Article, http://en.wikipedia.org/wiki/SPEKE_(cryptography), Accessed Oct. 7, 2008.

http://www.w2forum.com/i/SMS_is_still_mobile_data$_{13}$_king_on_GSM_networks/, Web site.

Yehuda Shiran, Ph.D., The Netscape 6 Event Listener, Article, Jan. 1, 2001, http://www.webreference.com/js/tips/010101.html, Accessed Nov. 24, 2008.

Verizon, How to Use Guide: Chaperone, http://wirelesssupport.verizon.com/how_to_use_chaperone.html?t=5, Accessed Oct. 8, 2008.

European Search Report, European Patent Application No. 09169303.6, Mar. 3, 2010.

Dilger, Daniel Eran, Is Apple's MobileMe Secure?, Aug. 22, 2008, Retrieved from the Internet: URL: http://www.roughlydrafted.com/2008/08/22/is-apples-mobileme-secure/, retrieved on Apr. 9, 2010.

\* cited by examiner

MOBILE DEVICE MANAGEMENT

TECHNICAL FIELD

The present disclosure relates generally to mobile communications devices and methods and more particularly to methods, devices and system for monitoring mobile communications devices.

BACKGROUND

Monitoring the use of mobile communications devices is an ongoing issue. Users of such devices can move about, whether or not the users are authorized to do so. Also, users can use the devices in ways that are not authorized. Such use can result in significant expenses.

Improvements to monitoring of mobile communications devices are desirable.

BRIEF DESCRIPTION OF THE DRAWINGS

Like reference numerals are used in the drawings to denote like elements and features.

DESCRIPTION

Figure 1:
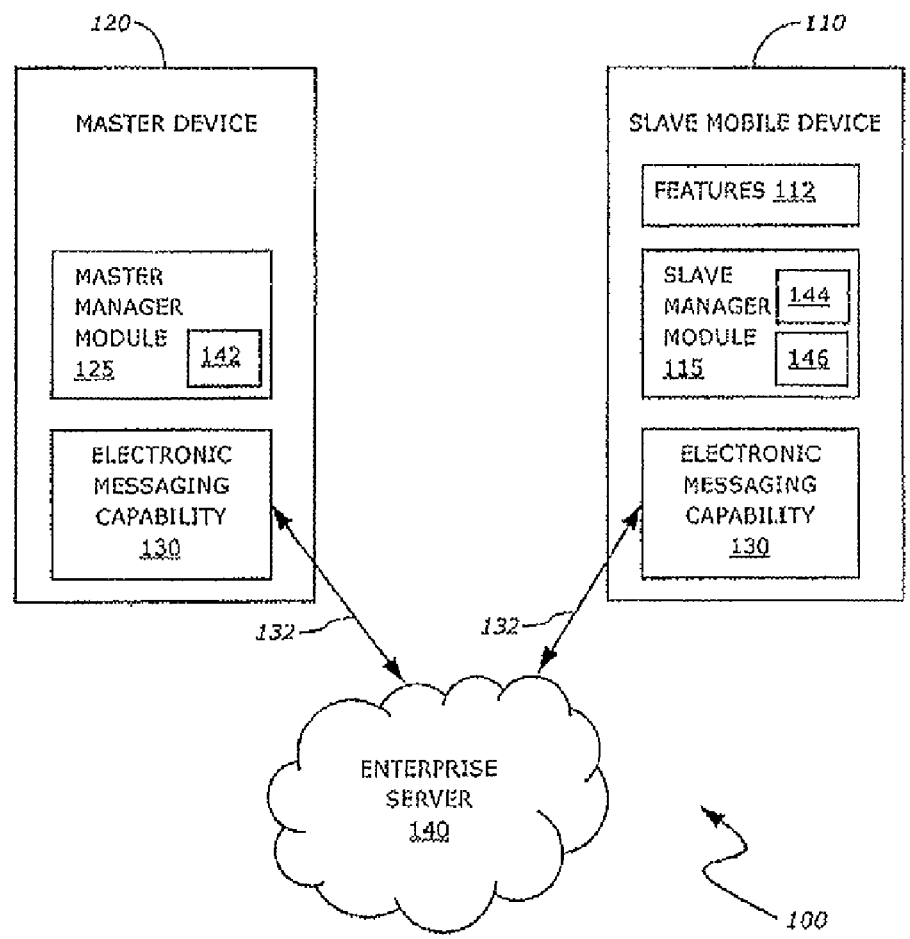
FIG. 1 is a block diagram of an example embodiment of a mobile device management system incorporating features of the present disclosure.

A device management system is described, in which a first mobile communications device (slave) is managed under the command of a second device (master). The slave mobile device is managed through a slave manager module resident on the slave mobile device. The master device commands the slave mobile device through the slave manager module. A master manager module is resident on the master device. The master device commands the slave manager module through at least one command message from the master device to the slave mobile device. The slave mobile device can be managed by controlling user-accessible features on the device, by monitoring user-accessible features, or both.

The user-accessible features that are managed by the slave manager module can comprise, for example, any user-accessible feature incorporated or installed on the slave mobile device, such as, cellular telephone functions, text messaging functions such as SMS or PIN messaging, e-mail functions, web browsers, games, multimedia applications including multimedia players or camera applications, social networking applications, calendars, address books, or GPS or mapping functions.

The slave manager module can be commanded to control the slave mobile device to prevent access by a user of the slave mobile device to one or more features according to certain criteria, such as for example, outside specified periods of time or dates, above a maximum usage level, to communicate except other than to permitted third parties, to communicate with prohibited third parties, or any combination of one or more of the foregoing.

The slave manager module can be commanded, for example, to monitor any of the above user-accessible features. Monitoring of one or more user-accessible features on the slave mobile device may comprise a periodic or on-demand transfer of data to the master device, such as recent accesses to user-accessible features. Additionally or alternatively, the slave manager module can provide an immediate notification of current status or prohibited activity.

Management commands can, for example, be communicated by the master manager module on the master device to the slave manager module on the slave mobile device and confirmed by the slave manager module to the master manager module, and monitored activity or status information can, for example, be communicated by the slave manager module to the master manager module in a message through any device-readable messaging capability, such as, for example, PIN messaging, SMS messaging and e-mail messages. Such messages are in some example embodiments, encrypted to provide security and reliability.

The master manager module and slave manager module can listen for such messages by periodically accessing incoming message queues of the message capability or setting forwarding capabilities of such messaging capabilities.

The present disclosure will now be described in detail for the purposes of illustration only, in conjunction with certain embodiments shown in the enclosed drawings.

Turning now to FIG. 1, there is shown a block diagram of an example embodiment of a mobile device management system incorporating features of the present disclosure. The system, shown generally at 100, comprises a first mobile device 110, designated the slave mobile device, and a second device 120, designated the master device. As an example, the slave mobile device 110 and the master device 120 may be used, respectively, by a child and parent, or by spouses, or by an employee and employer.

The slave mobile device 110 incorporates one or more mobile communication device features 112 which can be incorporated in one or more software applications on the slave mobile device 110, and a slave manager module 115 which can also be incorporated in one or more software applications on the slave mobile device 110. The slave manager module 115 receives one or more command messages from the master device 120 and manages the slave mobile device 110 in accordance with the command messages, by controlling or monitoring, access to one or more user-features 112.

Additionally, the slave manager module 115 can generate and transmit one or more confirmation messages to the master device 120 to confirm that command messages received from the master device 120 have been given effect. Further, the slave manager module 115 can generate and transmit one or more status report messages to the master device 120 providing updates as to the occasion, status and details of access to one or more monitored features of the slave mobile device 110.

The master device 120 can be a mobile device similar to the slave mobile device 110, except with a master manager module 125 in place of the slave manager module 115 which may be incorporated in one or more software applications on the master device 120. The master manager module 125 provides a user interface to display command options to command a slave manager module 115 and to accept command inputs from a user, and generates one or more command messages that the master manager module 125 transmits, to the slave manager module 115 of the slave mobile device 110. Additionally, the master manager module 125 accepts one or more confirmation messages from the slave manager module 115 or one or more status report messages from the slave manager module 115.

While the master device 120 is described above as being a mobile communications device similar to the slave mobile device 110, the master device 120 may be a device other than a mobile device, for example, a desktop computer (not shown) with SMS or other suitable device-readable messaging capability.

The slave mobile device 110 and the master device 120 each transmit and receive messages through two-way electronic (or device-readable) messaging capability 130 such that the slave manager module 115 and the master manager module 125 can read the content of the messages to perform the functions described herein. For example, the two-way electronic messaging capability 130 can use text-based electronic messaging such as email, personal identification number (PIN) messaging or short message service (SMS) text messaging functions, or other forms of electronic messaging. The two-way electronic messaging capability 130 may use other transport layers and protocols to the extent available to the slave manager module 115 and the master manager module 125. Such two-way electronic messaging capability 130 facilitates communication of messages between the slave mobile device 110 and the master device 120 and may involve network communications through one or more nodes, one of which may be a central enterprise server 140.

One or more listeners 142 may exist on the master device 120 to be utilized by the master manager module 125 to listen for messages communicated by the slave manager module 115 and one or more listeners 144 may exist on the slave mobile device 110 to be utilized by the slave manager module 115 to listen for messages communicated to it by the master manager module 125 or the occurrence of events or both.

Messages between the slave mobile device 110 and the master device 120 constitute a communications channel 132 extending between the slave mobile device 110 and the master device 120.

To address privacy concerns of users of the system 100, messages exchanged between the slave manager module 115 and the master manager module 125 are encrypted in some example embodiments by using a shared secret so that communications across the communications channel 132 can be authenticated by modules 115, 125 as having been sent by the corresponding other module 125, 115, and not altered or understood by a third party, including an enterprise server 140 that gives effect to the communications channel 132.

Methods of performing such encryption may include a unique password, commonly referred to as an encryption key, known to both modules 115, 125. For example, a message may be encrypted by the master manager module 125 using the password, and decrypted by the slave manager module 115 using the same password. Other example embodiments may use public-key encryption employing a private key and a public key.

One or more encryption keys can be manually input into the modules 115, 125 through human interface devices, such as keyboards, of the devices 110, 120 and appropriate user interface screens of the modules 115, 125. Alternatively, one or more encryption keys can be generated by one of modules 115 and 125 and manually input into the other module 125, 115. For example, one or more keys can be generated on master manager module 125 and manually input into the slave manager module 115 through a human interface device, such as a keyboard, of the slave mobile device 110 and an appropriate user interface screen of the slave manager module 115. As a further alternative, the keys can be exchanged between the modules 115, 125 over a secure network or other connection, such as a peer to peer network over a USB, or other physical, cable.

If desired, one or more keys can be exchanged between the modules 115, 125 using a key exchange protocol to jointly establish a shared key or otherwise exchange a key on an insecure network or other communications channel prior to establishment of a secure communications channel 132. A number of different protocols, such as Diffie-Hellman key exchange or SPEKE (Simple Password Exponential Key Exchange) can be used. Other protocols can also be used. Such protocols can be incorporated into the modules 115, 125 as desired to eliminate or minimize user input. Where encryption keys are to be exchanged, the keys could be generated on the respective devices apart from the modules 115, 125, such as an existing public key—private key pair, and exchanged, or created automatically by the modules 115, 125 upon installation, or upon request thereafter.

The exchanging or inputting of one or more encryption keys into the slave mobile device 110 and master device 120 to enable the secure communications channel is referred to as pairing, and results in a paired slave mobile device 110 and master device 120.

Pairing will typically be performed by a user of the master device 120 where tampering by the user of the slave mobile device 110 is a concern. Where such tampering is a concern, the slave manager module 115 can be configured to be non-user-accessible such that its encryption key and configuration cannot be altered once input except by a request message from the master manager module 120.

More than one slave mobile device 110 can be paired with any given master device 120, although, in some example embodiments there is only one master device 120 paired with each slave mobile device 110. A configuration allowing more than one master device 120 for a slave mobile device 110 may be appropriate, for example, if two parents, each having a master device 120, would like to manage the slave mobile device 110 of a child.

Because of the possibility of mischief by establishing a pairing between the slave mobile device 110 and a device (not shown) seeking to stand in as a master device 120, in some example embodiments a security mechanism is employed to reduce the likelihood of such other device (not shown) infiltrating itself as one of, or as, the master device 120. One example security mechanism may ensure that once a pairing is created between a slave mobile device 110 and a master device 120, no further pairing can be created between the slave mobile device 110 and any other device (not shown) as a master device 120, either at all, or without the participation of the existing master device 120, by way of authorization from the master device 120. Such an example embodiment prevents the creation of an undesired pairing between the slave mobile device 110 and such other device (not shown), should the slave mobile device 110 fall into the hands of a third party in possession of such other device (not shown), for example, where a child provides the slave mobile device 110 to another person.

Moreover, as also discussed later, depending upon the context, a particular mobile device may operate as both a slave mobile device 110 and as a master device 120 in a pairing with a third device (not shown).

A mobile communications device may have either or both of a slave manager module 115 and a master manager module 125, or a combined master/slave manager module (not shown) that operates in a master mode similar to the master manager module 125 and a slave mode similar to the slave manager module 115.

Two devices may be paired so that one acts as the slave mobile device 110 to the other's master device 120 and vice versa. Such an embodiment provides a mutual monitoring capability, for example, between spouses, where a mutual decision has been made to limit access to a text messaging capability to subscribed usage limits.

In such a scenario, each of the two sets of modules 115, 125 may be separately paired. Alternatively, they may share a common key if security between the users is not a concern.

User-accessible features on the slave mobile device 110 are managed by the master device 120 through the respective slavemanager module 115 and the master manager module 125. Such features 112 can comprise, for example, any user-accessible feature 112 incorporated or installed on the slave mobile device 110, such as, cellular telephone functions, text messaging functions such as SMS or PIN messaging, e-mail functions, web browsers, games, multimedia applications including multimedia players or camera applications, social networking applications, calendars, address books, or GPS or mapping functions.

The management of such user-accessible features 112 on the slave mobile device 110 may be controlled in some example embodiments by use of one or more processes 146 actuated and created by the slave manager module 115.

The slave mobile device 110 can be controlled by the master device 120 to prevent access by a user of the slave mobile device 110 to one or more features 112 according to certain criteria, such as for example, outside specified periods of time or dates, above a maximum usage limit, to communicate except other than to permitted third parties, to communicate with prohibited third parties, or any combination of one or more of the foregoing.

Thus, for example, a slave mobile device 110 may be controlled by the slave manager module 115 under the command of a paired master manager module 125 to prevent the slave mobile device 110 sending or receiving text messages, answering the phone or placing phone calls, accessing the internet or using multimedia applications, games or social networking applications during the week between the hours of 9:00 am and 3:00 pm, that is, during school hours.

Furthermore, a slave mobile device 110 may be controlled by the slave manager module 115 under the command of a paired master manager module 125 to prevent internet, text messaging, e-mail, cell phone usage or other fee-based services usage above given limits to limit excess use charges. As well, certain phone numbers (e.g. "900" or "976" pay per call services) or Internet sites could be forbidden, irrespective of when the attempted access occurred.

In some example embodiments, some monitoring settings on the slave manager module 115 can cause a status report to be sent from the slave manager module 115 to the master manager module 125 in the event that limits are reached or forbidden access is attempted.

By way of example, the master manager module 125 can command the slave manager module 115 through one or more control settings in the slave manager module 115 to selectively override usage limits, for example, to allow communications at any time by way of text message, e-mail or telephone to or from certain authorized persons, such as a 911 emergency call centre, parents, grandparents or siblings, or spouses, or employers, depending on the particular circumstances of use of the paired devices 110, 120. Methods of communication with authorized persons can be identified directly by device addressing data such as phone numbers, email addresses, SMS or PIN numbers, or the like, or by name through an address book to such addressing data, for example.

Additionally, certain features 112 may be monitored only, including without limitation, any of the above-referenced controllable user features 112.

Monitoring of one or more user-accessible features 112 on the slave mobile device 110 may comprise a periodic or on-demand download of pertinent information relating to recent accesses via one or more messages sent along communications channel 132, a current status or an immediate notification of certain prohibited or suspect activity in a message comprising a status report from the slave manager module 115 to the master manager module 125.

For example, as a safety measure for a user of the slave mobile device 110, the slave manager module 115 could be configured to provide one or more messages comprising status reports on a periodic basis (for example, at the end of the week) providing call, e-mail or text message logs. Additionally, the contents of the contact list relationships for a social networking module or subscriber identification module (SIM) card of the slave mobile device 110 could be downloaded in one or more messages comprising a status report on a periodic basis.

Thus, in the case of an abduction of a user of the slave mobile device 110, such logs could be retrieved from the master manager module 125 and analyzed to understand the user's recent activities with a view to establishing clues to the user's potential whereabouts and the contacts of the user could be contacted if the user is missing.

In the same vein, if a user of the slave mobile device 110 has disappeared and the slave mobile device 110 is equipped with a GPS receiver and mapping module, additional messages comprising status reports could be requested by a user of the master device 120 using the functionality of the master manager module 125 on an as-needed basis. For example, the slave manager module 115 could report the present whereabouts of the slave mobile device 110 by accessing its mapping module.

The mapping module can be controlled by the slave manager module 115 under direction of the master manager module 125 to keep data regarding the location of the slave mobile device 110 for a rolling period of time, and to provide such data upon request in one or more messages comprising a status report. For example, such a message could report the location of the slave mobile device 110 the previous evening (including when it was returned home), or whether the slave mobile device 110 deviated from a predetermined path, for example, from school to home after school (useful in the case of a younger child, whether walking or travelling by bus).

Additional capabilities for the system 100, the slave mobile device 110, and the master device 120 are possible. Furthermore, as more and varied user-accessible features 112 become available and more prevalent on slave mobile devices 110, the system 100 may be configured to manage (through monitoring or controlling, or both) such additional user-accessible features 112 to provide a richer and more varied capability set.

The master manager module 125 provides suitable user interface screens to display management options to a user of the master device 120 and the user-selection of such options by a user of the master device 120.

Master Manager Module Processing

Figure 2:
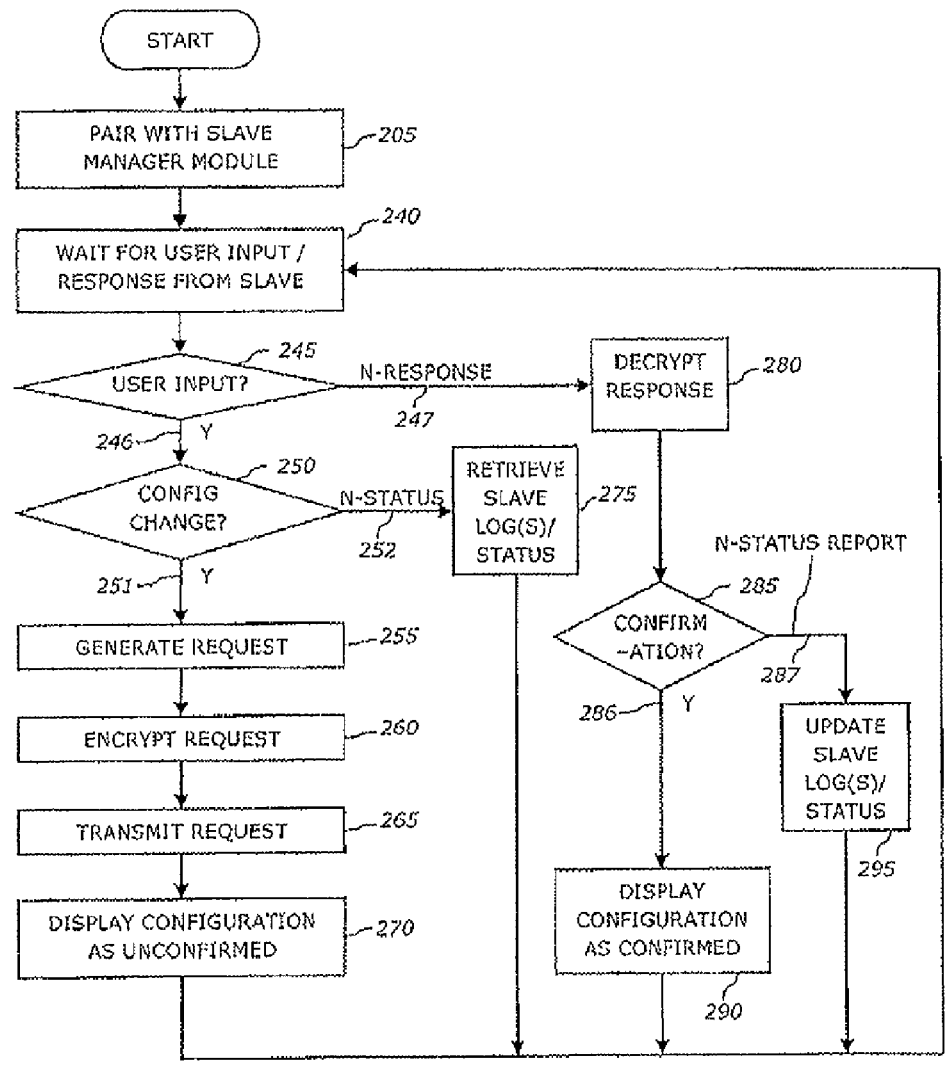
FIG. 2 is a flow chart showing example processing actions performed by a master manager module on a master device according to an example embodiment of the present disclosure.

Turning now to FIG. 2, there is shown a flow chart showing example processing actions for the general operation of a master manager module, such as the master manager module 125 of FIG. 1 operating on a master device, such as the master device 120 of FIG. 1 as part of the management of a slave mobile device, such as slave mobile device 110 of FIG. 1. The operation of the master manager module 125 is not limited to the shown processing actions, nor are the shown processing actions limited to operation on the master device 120.

The master manager module 125 is initially paired (action 205) for secure communication of messages with the slave manager module 115 of FIG. 1 by the input of one or more encryption keys into the master device 120 and the slave device 110 as discussed in relation to FIG. 1.

Thereafter, the master manager module 125 waits (action 240) for an input to process, which may be either a user input at the master manager module 125 or a response from the slave manager module 115. Such user inputs are understood to be in relation to the master manager module 125 if the user interface screen of the master manager module 125 is the currently active window on the display of the master device 120 and user inputs are understood to be in relation to the user interface screen. Such responses from the slave manager module 115 are recognized by one or more listeners 142, which detect the receipt of a response from the slave manager module 115.

In one example embodiment, the processing flow first determines whether the input was a user input (action 245) and if this is not the case, processes the input as a response (path 247). In some example embodiments (not shown), the processing flow determines whether the input was a response and if this is not the case, processes the input as a user input. In other example embodiments, the determination of whether the input was a user input and of whether the input was a response may be performed effectively simultaneously.

If the input is a user input (path 246), then the master manager module 125 determines (action 250) if the user input is indicative of a request to change the configuration of the slave mobile device 110 or else to retrieve the logs(s) or status report(s) of the slave mobile device 110. Such log(s) or status report(s) are derived from one or more responses previously communicated by the slave manager module 115 to the master manager module 125 and stored by the master manager module 125 or the master device 120, for example, in memory.

If the user input is indicative of a request to change the configuration of the slave mobile device 110 (path 251), the master manager module 125 generates (action 255) a request that the configuration of the slave mobile device 110 be altered in accordance with the user input, encrypts the request (action 260) and transmits the request (action 265) to the slave manager module 115 of the slave mobile device 110. Thereafter, the master manager module 125 updates a user interface screen displaying a configuration of the slave mobile device 110, with the requested configuration change marked or highlighted to indicate that the configuration selection has not been confirmed (action 270). Thereafter, the loop processing resumes by waiting (action 240).

If the user input is indicative of a request to retrieve the log(s) or status report(s) of the slave mobile device 110 (path 252), the master manager module 125 retrieves this information (action 275). The retrieved log or status report information is output through one or more ports of the master device 120, displayed on one of the displays associated with the master device 120, or by any other suitable mechanism. Thereafter, the loop processing resumes waiting (action 240).

If the input is a response from the slave manager module 115 (path 247), then the response is decrypted (action 280). Thereafter, the response may be interpreted (action 285) to see if it contains a confirmation that a configuration change requested by the master manager module 125 to the slave manager module 115 (action 265) has been given effect by the slave manager module 115, or a status report.

If the response is a confirmation (path 286), then the master manager module 125 updates (action 290) the user interface screen displaying the configuration of the slave mobile device 110, with the requested change marked or highlighted to indicate that the configuration selection has been confirmed. Thereafter, the loop processing resumes waiting (action 240).

If the response is a status report (path 287), then the master manager module 125 can update (action 295) the log or status information stored by the master device 120 corresponding to the status of the slave mobile device 110 as indicated by the status report. For some reports the master manager module 125 can be configured to present an alert by way of a user interface display a voice message, or both, in combination with one or more visual, audible, or tactile alerts. For other reports, log or status information are simply stored by the master device 120 for later retrieval and/or display (action 275). After updating the log or status information, the loop processing resumes waiting (action 240).

In some embodiments (not shown) the step of retrieving information (275) from slave mobile device 110 may comprise generating a request, encrypting a request, and transmitting a request (similar to steps 255, 260 and 265).

Slave Manager Module Processing

Figure 3:
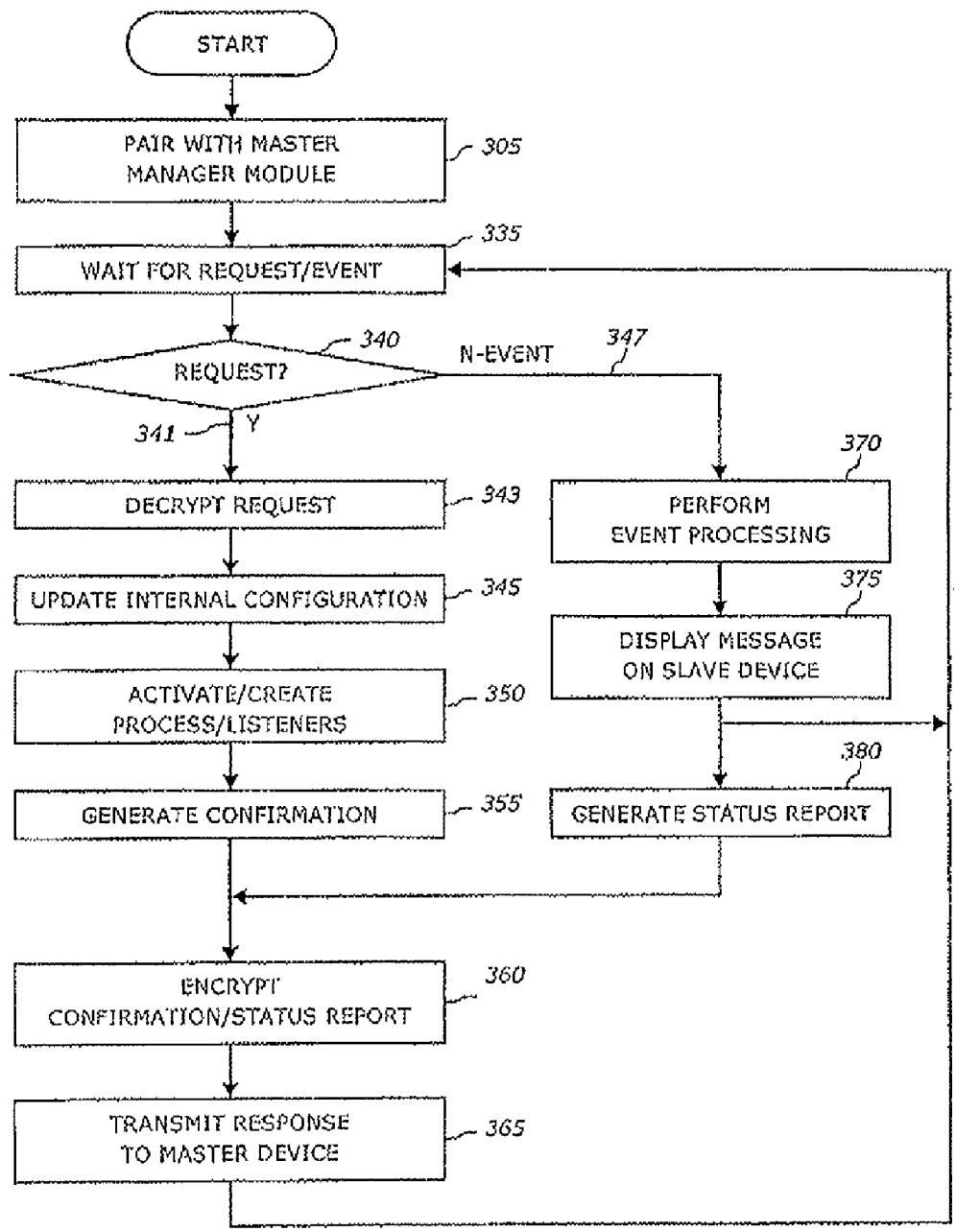
FIG. 3 is a flow chart showing example processing actions performed by a slave manager module on a slave mobile device according to an example embodiment of the present disclosure.

Turning now to FIG. 3, there is shown a flow chart showing example processing actions for the general operation of a slave manager module, such as the slave manager module 115 of FIG. 1. The operation of the slave manager module 115 is not limited to the shown processing actions, nor are the shown processing actions limited to operation on the slave mobile device 110.

The slave manager module 115 is initially paired (action 305) for secure communication of messages with the master manager module 125 according to one of the embodiments described in relation to FIG. 1.

Thereafter, the slave manager module 115 waits (action 335) for an input to process, signaled by one or more of the event listeners 144. Event listener 144 is configured to signal an input upon the receipt of a request from the master manager module 125 and upon the occurrence of an event at mobile slave device 110.

In one example embodiment, the processing flow first determines whether the input signaled by event listener 144 is a request from the master manager module 125 (action 340) and if this is not the case, the signaled event is processed as an event (action 370). In some example embodiments (not shown) the processing flow first determines whether the input was an event and if this is not the case, processes the input as a request. In example embodiments, the determination of whether the input was a request and of whether the input was an event may be performed effectively simultaneously.

If the input is a request (path 341), then the slave manager module 115 decrypts the request (action 343) and updates an internal configuration of the slave mobile device 110 maintained by the slave manager module 115 (action 345) to reflect a requested configuration change embodied in the request. Thereafter, the slave manager module 115 activates (which may involve creating) one or more processes 146 (action 350) to give effect to the request and as appropriate, creates one or more event listeners 144 to trigger upon the occurrence of a described event in the process(es) thus activated.

For a first example, if the requested configuration change was to indicate that outgoing calls are thereafter to be prohibited during the week between the hours of 9:00 am and 3:00 pm, that is, during school hours, an event listener 144 could be created against a telephone module, to be triggered whenever an outgoing call is being attempted. If an outgoing call was thereafter initiated, the listener 144 is triggered (action 335) and the event may be processed (action 370) by the slave manager module 115.

For a second example, if the requested configuration change indicates that outgoing text messaging are thereafter to be limited to a maximum of 200 messages in a calendar month, an event listener could be created against an electronic messaging module, to be triggered whenever a text message is being attempted. Similarly, an event listener 144 could be created if the requested configuration change was to indicate that cell phone usage was therefore to be restricted to a maximum number of minutes per month to be triggered whenever a cell phone call is attempted.

For a third example, if the requested configuration change indicates that the master device 120 is to be notified by a status report in the event that the location of the slave mobile device 110 varied by a specified distance from a pre-determined path at a certain time of day, for example, during the week starting at 3:00 pm, one or more event listeners could be created against a mapping module, to be triggered when the speed or direction of the slave mobile device 110 deviates beyond a threshold, when the position of the slave mobile device 110 deviates from the path by a pre-determined amount, or when the position of the slave mobile device 110 exceeds a geo-fence established about the destination or the path.

For a fourth example, if the requested configuration change indicates that a status report containing certain log data or status information was to be periodically transmitted by the slave mobile device 110 to the master device 120, an event listener could be created, to be triggered upon the expiry of the specified or pre-determined period.

Further processes 146 or event listeners 144 can be utilized to listen for events and carry out additional processes, or both, according to other configurations that may be requested from time to time by the master management module 125 such as in response to user inputs at the master device 120.

Once the processes 141 or listeners 144 have been activated or created (action 350), the slave manager module 115 generates a confirmation (action 355), encrypts the confirmation (action 360) and transmits the encrypted confirmation as a response (action 365) to the master manager module 125 of the master device 120 for processing by the master manager module 125 as discussed above (action 290). This confirmation signifies that the configuration request message received by the slave manager module 115 has been processed and the appropriate processes 146 and event listeners 144, or both, have been seen activated or created.

If the input is the occurrence of an event (path 347), the slave manager module 115 performs (action 370) processing associated with the event (usually through one or more activated or created process(es) 146 established at action 350). Depending upon the context of the configuration scenario represented by the event, the slave manager module 115 may display (action 375) information or a notification on a display (such as display 410 shown in FIG. 4) of the slave mobile device 110, or may generate (action 380) a status report message to advise the master manager module 125 of certain activity, or both.

In the case of the first example discussed above, the slave manager module 115, when triggered (action 370) by an event listener 144 may activate or create a process 146 that would compare system time on the slave device 110 against the permitted hours. If the system time fell within the prohibited range, the process 146, or in some example embodiments the slave management module 115 or both would not permit the call to be completed. For example, a telephone module (such as telephone module 543 shown in FIG. 5) could allow the installation of a hook or call back before the call is placed. Then, when the call is being requested, the telephone module 543 would first advise the slave manager module 115 of any pertinent details, such as the phone number, to request permission to place the call. If permission is denied by the slave manager module 115 this status could be returned to the telephone module 543 so that the denial of access could be reported in a standard message format to the user of the slave mobile device 110.

Alternatively or in addition, the slave manager module 115 could report this scenario to the user of the master device 120. In such an instance, the slave manager module 115 may generate (action 380) a status report to advise the master manager module 125 that an attempt to place a phone call within a prohibited time period had been made, encrypt (action 360) the status report and transmit (action 365) the encrypted status report as a response to the master manager module 125 of the master device 120 for processing as discussed above (action 295 of FIG. 2). As well or alternatively, a message could be displayed (action 375) on a display 410 (FIG. 4) of the slave mobile device 110 advising that the attempted phone call had failed or that the master device 120 had been notified.

If the system time fell outside the prohibited range, the phone call would be allowed to proceed in conventional fashion.

In the case of the second example discussed above, the slave manager module 115, when triggered (action 370) by an event listener may activate or create a process 146 that could maintain an internal count of outgoing text messages for a given calendar month and upon being triggered would, attempt to increment this count. If the incremented internal count exceeds the maximum, the count is not incremented and the attempt to send the text message is stopped in a similar manner as described in connection with the first non-limiting example. As before, the slave manager module 115 can generate (action 380) a status report to advise the master manager module 125 that the maximum number of text messages had been reached for that month, encrypt (action 360) it and transmit the encrypted message to the master manager module 125 of the master device 120 for processing as discussed above. As well or alternatively, a message can be displayed (action 375) on a display 410 (FIG. 4) of the slave mobile device 110, advising that the attempt had failed and that the master device 120 had been notified.

Alternatively, if the incremented internal count has not yet reached the threshold value, the outgoing text message is allowed to proceed in conventional fashion.

In the case of the third example discussed above, the slave manager module 115, when triggered (action 370) by an event listener 144, may activate or create a process 146 which would compare the location of the slave mobile device 110, returned by the event listener 144, against the path. If the location exceeds a pre-determined geo-fence or polygon about the path, the slave mobile device 110 deviates from the path beyond a threshold distance, or the slave mobile device 110 exceeds a predetermined geo-fence about the destination after a predetermined time period, the slave manager module 115 can generate (action 380) a status report message to advise the master manager module 125 that the slave mobile device 110 had deviated unacceptably from its pre-determined path. The slave manager module 115 encrypts (action 360) the status report and transmits (action 365) the encrypted response to the master manager module 125 of the master device 120 as discussed above. As well or alternatively, a message could be displayed (action 370) on a display 410 (see FIG. 4) of the slave mobile device 110 advising that the device was deviating unacceptably from its pre-determined path and that the master device 120 had been notified.

In the case of the fourth example discussed above, the slave management module 115 when triggered (action 370) by an event listener 144 may activate or create a process 146 that generates (action 380) one or more status reports in one or more messages. Such status reports may contain desired log data or status information, for example, the time, length and phone number of all incoming or outgoing calls, the time of all incoming or outgoing e-mails or text messages and the part(ies) with whom the e-mails or text messages were communicated, any new entries in the address book of the slave mobile device 110, or any new relationships created through one or more of the social networking sites subscribed by the social networking module. The slave management module 115 encrypts (action 360) the status report and transmits (action 365) the encrypted response to the master manager module 125 of the master device 120 as discussed above. As well or alternatively, a message can be displayed (action 375) on a display 410 (FIG. 4) of the slave mobile device 110 advising that such data was being distributed.

It will be appreciated that the nature of the processing performed, and the four examples set out above are by way of illustrative example only and not intended to be limiting in any fashion.

It will also be appreciated that some of the event processing for a given requested configuration may be shared with other control configurations or that multiple event listeners 144 could be created, one or more for each associated control configuration.

Example Mobile Device

Figure 4:
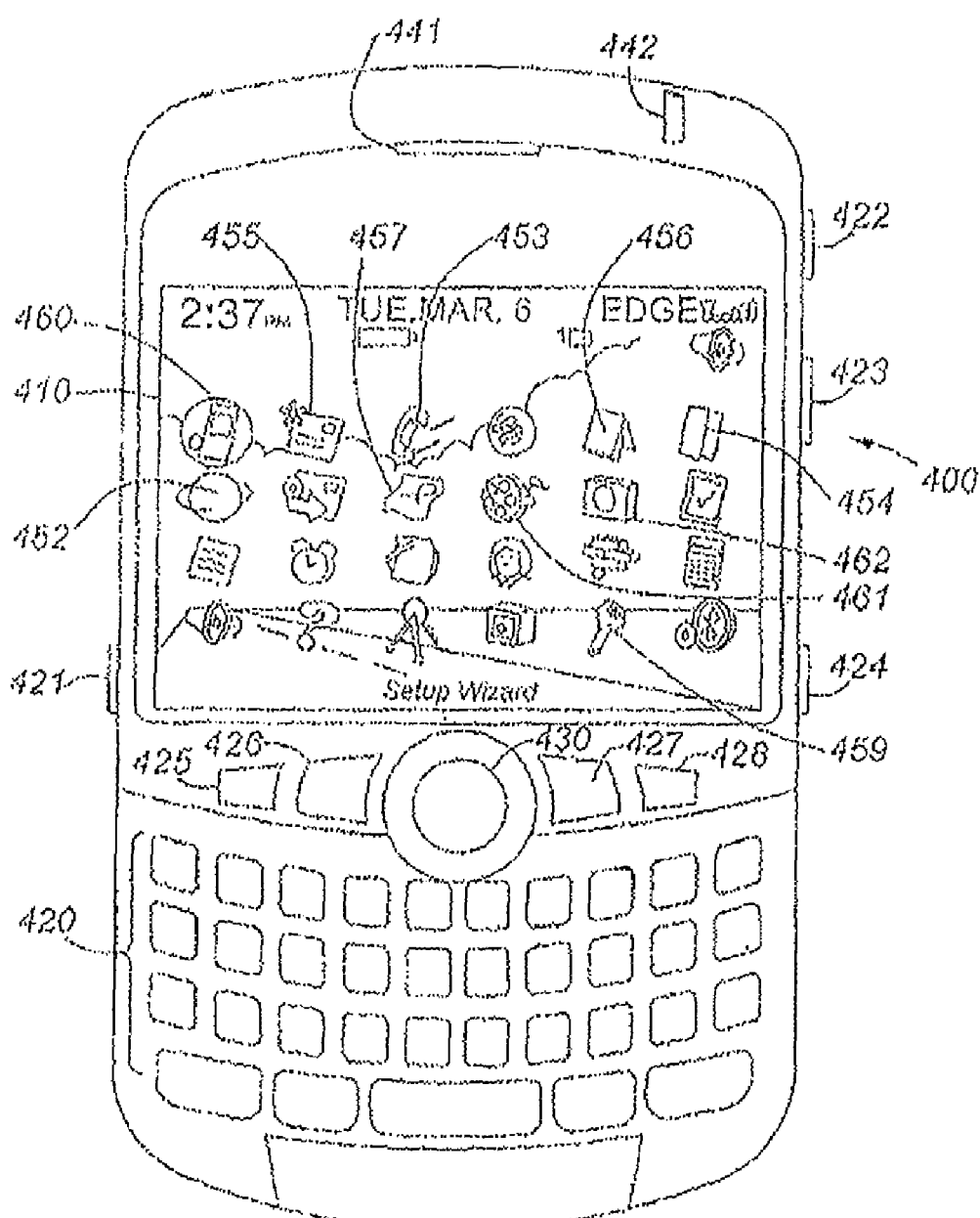
FIG. 4 is a graphical representation of a front view of an example of a mobile device suitable for performing the example processing actions of FIG. 3 or FIG. 2, or both.

Referring now to FIG. 4, there is shown a graphical representation of a front view of an example of a mobile device 400 can serve as either or both of the slave mobile device 110 and the master device 120. The mobile device 400 has two-way wireless electronic messaging capabilities and possibly also wireless voice communications capabilities. The mobile device 400, in various embodiments the mobile device 400 can be, for example, a wireless handset. A mobile device configured as a wireless handset can be further configured as either a data communications device, a multiple-mode communications device configured for both data and voice communication, a mobile telephone, a pager, a personal digital assistant (PDA) enabled for wireless communications, a personal entertainment device enabled for wireless communications. The mobile device 400 can be, for example, a telecommunications device installed within a vehicle, a portable or laptop or notebook or tablet computer with a wireless modem or wireless network card.

Figure 5:
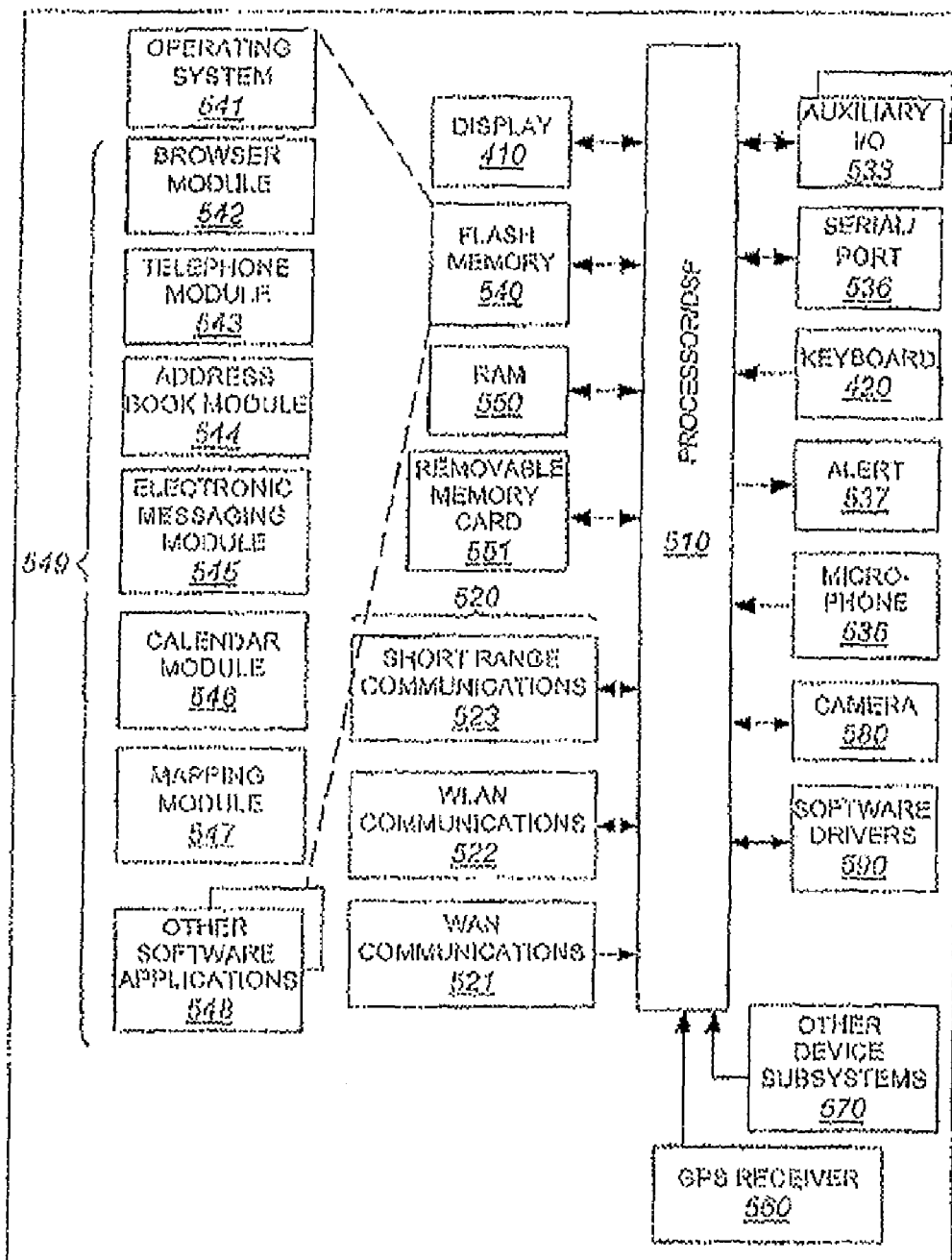
FIG. 5 is a simplified block diagram of the example mobile device of FIG. 4.

The mobile device 400 includes a display screen 410, an alphanumeric keyboard or keypad 420, optionally one or more non-keyboard inputs, such as buttons 421-428, which may be navigational, function, exit or escape keys, which may be inwardly depressed to provide further input function, or touch-sensitive areas (not shown) within the display screen 410, or a rotatable input device such as a trackball 430 or scrollwheel or trackwheel or trackpad (not shown) and a speaker 441, visible indicator 442 or other alert 537 (shown on FIG. 5).

The keyboard or keypad 420 may comprise a touch-sensitive surface (not shown). In some example embodiments keys in the keyboard 420 may contain one or more letters aligned in a QWERTY layout. In some example embodiments the keys in the keyboard 420 may not be actual physical keys but may be virtual keys displayed on a touch screen display (not shown). In some example embodiments, the keyboard 420 includes a QWERTZ layout, an AZERTY layout, a Dvorak layout, sequential type layouts or the like, or a traditional numeric keypad (not shown) with alphabetic letters associated with a telephone keypad. In some example embodiments, the keyboard 420 layout has reduced keys, such as a reduced QWERTY layout.

Referring now to FIG. 5, the mobile device 400 includes a controller that includes at least one processor or digital signal processor (DSP) 510 for controlling the overall operation of the mobile device 400. The processor 510 interacts with a communications subsystem shown generally at 520, and with further device subsystems such as display 410, which may include a touch-sensitive surface, keyboard or keypad 420, one or more auxiliary input/output (I/O) subsystems or devices 533 (e.g. trackball 430, non-keyboard inputs 421-428 or a scrollwheel, trackpad or trackwheel (not shown) and their associated controllers), one or more alerts 537 (which may be audible 441, visible 442 and/or tactile (not shown)) or a headset port (not shown), a microphone 535, a serial port 536, which may be a universal serial bus (USB) port, a flash memory 540, random access memory (RAM) 550, a removable memory card 551, a charge-coupled device (CCD) camera 580, a global positioning system (GPS) (or other navigation) satellite receiver 560, and any other device subsystems generally designated as 570.

The processor 510 operates under stored program control of the operating system software or firmware 541 and various software or firmware applications 549 used by the microprocessor 510, which are, in one example embodiment, stored in a persistent store such as flash memory 540 or similar storage element. The operating system 541 software applications shown generally at 549, or parts thereof, may be temporarily loaded into a volatile store such as RAM 550.

The processor 510 executes operating system software drivers 590 that provide a platform from which the rest of the software 541, 549 operates. The operating system software drivers 590 provide drivers for the device hardware with standardized interfaces that are accessible to application software. The operating system software drivers 590 include application management services ("AMS") (not shown) that transfer control between applications running on the mobile device 400.

The processor 510, in addition to its operating system 541 functions, in example embodiments, enables execution of software applications 549 for interacting with the various device subsystems of the mobile device 400, by presenting options for user-selection, controls for user-actuation, or cursors or other indicators for user-direction. The mobile device 400 may further accept user data entry, including numbers to dial or various parameter values for configuring the operation of the mobile device 400.

A predetermined set of software applications 549 may be executed in response to user commands to control basic device operations, including data and voice communication applications, such as a web browser module 542, a telephone module 543, an address book module 544, an electronic messaging module 545 (which may include e-mail, SMS messaging or PIN messaging) and a calendar module 546, for example, will normally be installed on the mobile device 400 during manufacture. Further software applications 548, such as the master manager module 125, the slave manager module 115, a mapping module 547, a game (not shown), a media player (not shown), a camera (not shown), one or more Java applications (not shown), and in some example embodiments, the master manager module 125 may also be loaded onto the mobile device 400 during manufacture, or through wired or wireless communications along the communications subsystem 520, the auxiliary I/O subsystem 533, serial port 536, information carrier media such as portable data storage media like the removable memory card 551, or any other suitable subsystem 570, and installed in the RAM 550 or a non-volatile store such as the flash memory 540 for execution by the processor 510. These applications may configure the mobile device 400 to perform various functions in response to user interaction. Such flexibility in application installation increases the functionality of the mobile device 400 and may provide enhanced on-device functions, communication-related functions, or both. In some embodiments, some or part of the functionality of the functional modules can be implemented through firmware or hardware components instead of, or in combination with, computer software instructions executed by the processor 510 (or other processors (not shown)).

The various software applications 548, 549 may constitute the user-accessible features 112 of the slave mobile device 110, including various modules referred to previously in this description with respect to the slave mobile device 110, such as browser module 542, telephone module 543, address book module 544, electronic messaging module 545 (providing two-way electronic messaging capability 130), calendar module 546, mapping module 547, game module, media player, and camera.

Under instructions from various software applications 549 resident on the mobile device 400, the processor 510 is configured to implement various functional components or modules, for interacting with the various device subsystems of the mobile device 400. Additionally, the processor 510 may be configured or programmed over-the-air, for example from a wireless base station 610, a wireless access point 621 (shown on FIG. 6), or a peer mobile device 400, for example, in the case of the slave mobile device 110, the master device 120 as disclosed herein, The software applications 549 may comprise a compiled set of machine-readable instructions that configure the processor 510 to provide the desired functionality, or the software applications 549 may be high-level software instructions to be processed by an interpreter or compiler to indirectly configure the processor 510.

An icon is shown highlighted or focused by a caret or selection symbol 460 which can be navigated by a device user among the displayed icons through manipulation of the trackball 430 (or other navigational input device). The trackball 430 is also depressible, such that depression of the trackball 430 when an icon is highlighted or focused by selection symbol 460 results in the launch of functions of the associated module.

Each of the software applications 549 may include layout information defining the placement of particular fields, such as text fields, input fields, etc., in a user interface for the software application 549.

Figure 6:
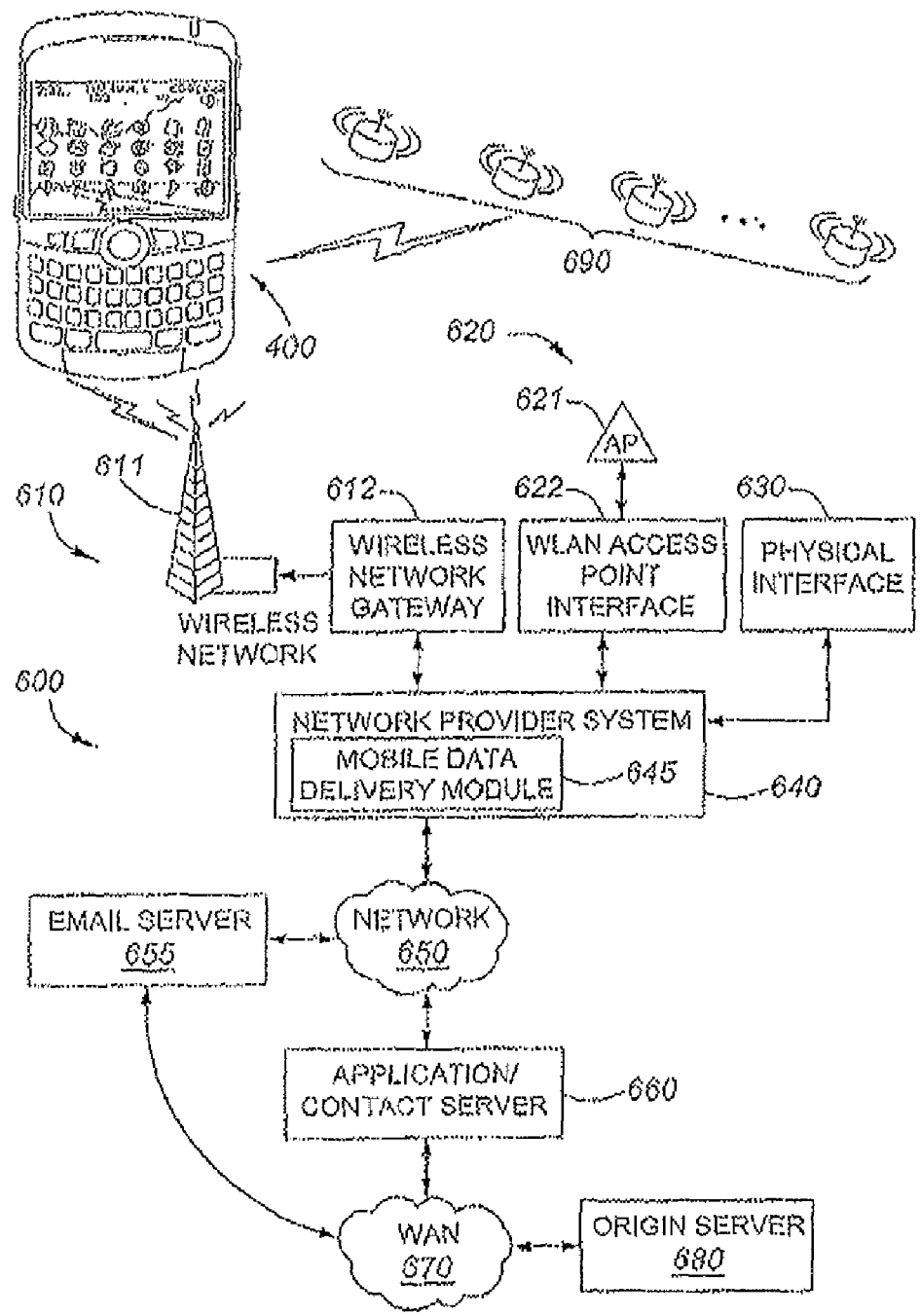
FIG. 6 is a simplified block diagram of a communications environment suitable for the example mobile device of FIG. 4.

In FIG. 5, the communications subsystem 520 acts as an interface between the mobile device 400 and a communications environment 600 shown in FIG. 6. The particular configuration of the communications subsystem 520 will be dependent upon the communications network(s) in the communications environment 600 in which the mobile device 400 is intended to operate.

In FIG. 6, the communications environment 600 is shown to include one or more mobile devices 400 (only one of which is shown in FIG. 6), a wireless Wide Area Network (WWAN) 610 and associated base station 611, a Wireless Local Area Network (WLAN) 620, or other interfaces. In some example embodiments, the mobile device 400 is configured to communicate in both data and voice modes over both WWAN 610 and WLAN 620 networks and to roam between such networks.

Thus, in the example embodiment shown in FIG. 5, the communications subsystem 520 includes a WWAN communications module 521, a WLAN communications module 522 and a short range communications module 523.

The WWAN communications module 521 provides two-way communications with the WWAN 610 and the WLAN communications module 522 provides two-way communications with the WLAN 620 along an access point 621 associated therewith.

The processor 510 may communicate with a wireless network via the analog baseband processing unit. In some embodiments, the communication may provide Internet connectivity, enabling a user to gain access to content on the Internet and to send and receive e-mail or text messages, such as the messages exchanged between the slave manager module 115 on the slave mobile device 110 and the master manager module 125 on the master device 120. The flash memory 540, RAM 550 and the removable memory card 551 may provide software and data to configure the operation of the processor 510. Among the interfaces may be the serial port 536 and the short range wireless communication sub-system 523. The serial port 536 may be used to charge the mobile device 400 and may also enable the mobile device 400 to function as a peripheral device to exchange information with a personal computer or other computer system. The short range wireless communication sub-system 523 may include an infrared port, a Bluetooth interface, an IEEE 802.11 compliant wireless interface, or any other short range wireless communication sub-system, which may enable the mobile device 400 to communicate wirelessly with other nearby mobile devices or wireless base stations (not shown).

In a data communications mode, a received signal such as a text message or web page download will be processed by the communications subsystem 520 and output to the processor 510, which further processes the received signal for output to the display 410, or alternatively to an auxiliary I/O device 533.

The flash memory 540 or other persistent storage of the mobile device 400 may house, in addition to software or firmware stored program instructions, certain information including address book information such as telephone numbers, email or instant text messaging addresses and PIN numbers. Such information may also be at least partially stored at least some of the time in memory of a Subscriber Identity Module (SIM) card (not shown) used with the mobile device 400, in volatile device memory (such as the RAM 450), or at a location accessible to the mobile device 400 over WWAN 610. Additionally, the flash memory 540 may be used to store data structures, preferences or parameters, including without limitation, requests and status information.

The RAM 550, which may constitute non-volatile or volatile memory, with or without battery backup, may be used as a supplement to, or in place of, flash memory 540, and to maintain data or program instructions for use by the processor 510 in executing one or more of the functions of operating system 541 or the software applications 549.

Example Communications Environment

Turning now to FIG. 6, the WWAN 610 may be implemented as a packet-based cellular network that includes a number of base stations 611 (only one of which is shown), where each of the base stations 611 provides wireless Radio Frequency (RF) coverage to a corresponding area or cell. The WWAN 610 is typically operated by a cellular network service provider that sells subscription packages to users of mobile electronic devices. The WWAN 610 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), IDEN (Integrated Digital Enhanced Network) or various other networks such as EDGE (Enhanced Data rates for GSM Evolution) or UMTS (Universal Mobile Telecommunications Systems).

The communications environment 600 also includes a wireless network gateway 612 and one or more network provider systems 640. The wireless network gateway 612 provides translation and routing services between the network provider system(s) 640 and the WWAN 610, which facilitates communication between the mobile device 400 and other devices (not shown) connected, directly or indirectly, to the network provider system 640.

The WLAN 620 comprises a network which, in some example embodiments, conforms to IEEE 802.11 standards such as 802.11b or 802.11g; however, other communications protocols may also be used for the WLAN 620. The WLAN 620 includes one or more wireless RF Access Points (AP) 621 (one of which is shown), that collectively provide a WLAN coverage area. The WLAN 620 may be operated by an enterprise (for example, a business or university) and the access points 621 are connected to an access point (AP) interface 622. The AP interface 622 provides translation and routing services between the access points 621 and the network provider system 640 to facilitate communication between the mobile device 400 and other devices (not shown) connected directly or indirectly, to the network provider system 640. The AP interface 622 is implemented using a computer, for example, a server running a suitable computer program or software.

According to one embodiment, other interfaces may be implemented using a physical interface 630. The physical interface 630 may include an Ethernet, Universal Serial Bus (USB), Firewire or infrared (IR) connection implemented to exchange information between the network provider system 640 and the mobile device 400 when physically connected therewith.

The network provider system 640 comprises a server which is located behind a firewall (not shown). The network provider system 640 provides access for the mobile device 400, through either the WWAN 610, the WLAN 620, or one of the physical interfaces 630 to the devices connected, for example, through an enterprise network 650 (e.g. an intranet), to the network provider system 640, such as a network 650, an email server 655, one or more application/content servers 660, a second WWAN 670 or an origin server 680.

According to one embodiment, a mobile data delivery module 645 provides HTTP connectivity between the WWAN 610 and the WLAN 620 and the other physical connections 630 and devices or networks connected directly or indirectly to the network provider system 640. In one embodiment, the mobile data delivery module 645 is implemented on a computer, such as one housing the network provider system 640. The network 650, the email server 655, the application/content server 660, the second WWAN 670 and the origin server 680 are individually or collectively in various combinations, a content source for the network provider system 640. It will be appreciated that the system shown in FIG. 6 comprises one possible communications network or configuration for use with the mobile device 400.

The network 650 may comprise a local area network, an intranet, the Internet, a direct connection, or combinations thereof. According to one embodiment, the network 650 comprises an intranet for a corporation or other type of organization.

In one example configuration, the email server 655 is connected to the network 650. This server 655 is configured to direct or redirect email messages received over the second WWAN 670 and internally within the enterprise network 650 to be addressed to the mobile device 400.

The application/content server 660 may be connected to the network 650 and also to another network, for example, the second WWAN 670.

The second WWAN 670 may further connect to other networks. In one embodiment, the second WWAN 670 comprises or is configured with the Internet, a direct connection, a LAN, a wireless communication link, or any combination thereof.

Content providers, such as the origin server 680, or Web servers, may be connected to the second WWAN 670.

The communications environment 600 may also include a network of Global Positioning System (GPS) or other system of navigation satellites 690.

In the foregoing disclosure, for purposes of explanation and not limitation, specific details are set forth such as particular architectures, interfaces, techniques, etc. in order to provide a thorough understanding of the present disclosure. However, it will be apparent to those having ordinary skill in this art that the present disclosure may be practiced in other embodiments that depart from these specific details.

In some instances, detailed descriptions of well-known devices, circuits, and methods are omitted so as not to obscure the description of the present disclosure with unnecessary detail. All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

Similarly, it will be appreciated that any flow charts, state transition diagrams, pseudocode, and the like represent various processes, which may be substantially represented in computer-readable medium and so executed by a computer or processor, whether or not such computer or processor is explicitly shown.

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and methods and actions can be performed by a programmable processor executing a program of instructions to perform functions of the disclosure by operating on input data and generating output.

The functions of the various elements including functional blocks labelled as "modules", "processors" or "controllers" may be provided through the use of dedicated hardware, as well as hardware capable of executing software in association with appropriate software with sufficient processing power, memory resources, and network throughput capability to handle the necessary workload placed upon it.

When provided by a processor, the functions may be provided by a single dedicated processor, by a single shared processor, or by a plurality of individual processors, some of which may be shared or distributed. Moreover, explicit use of the term "module", "processor" or "controller" should not be construed to refer exclusively to hardware capable of executing software, and may include, without limitation, digital signal processor (DSP) hardware, read-only memory (ROM) for storing software, random access memory (RAM) and non-volatile storage.

The disclosure can be implemented advantageously on a programmable system including at least one input device, and at least one output device. Each computer program can be implemented in a high-level procedural or object-oriented programming language, or in assembly or machine language, if desired; and in any case, the language can be a compiled or interpreted language.

Suitable processors include, by way of example, both general and specific microprocessors. Generally, a processor will receive instructions and data from a read-only memory or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches or flip flops. Any of the foregoing can be supplemented by, or incorporated in ASICs (application-specific integrated circuits), FPGAs (field-programmable gate arrays) or DSPs (digital signal processors).

Examples of such types of computer are programmable processing systems contained in the processor 510 and other DSPs (not shown) suitable for implementing or performing the apparatus or methods of the disclosure. The system may comprise a processor, (which may be referred to as a central processor unit or CPU), which may be implemented as one or more CPU chips, and that is in communication with memory devices including secondary storage, read only memory (ROM), a random access memory, a hard drive controller, or an input/output devices or controllers, and network connectivity devices, coupled by a processor bus.

The secondary storage is typically comprised of one or more disk drives or tape drives and is used for non-volatile storage of data and as an over-flow data storage device if RAM is not large enough to hold all working data. Secondary storage may be used to store programs which are loaded into RAM when such programs are selected for execution. The ROM is used to store instructions and perhaps data which are read during program execution. ROM is a non-volatile memory device which typically has a small memory capacity relative to the larger memory capacity of secondary storage. The RAM is used to store volatile data and perhaps to store instructions. Access to both ROM and RAM is typically faster than to secondary storage.

I/O devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) or global system for mobile communications (GSM) radio transceiver cards, and other well-known network devices. These network connectivity devices may enable the processor to communicate with an Internet or one or more intranets. With such a network connection, it is contemplated that the processor might receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The network connectivity devices may also include one or more transmitter and receivers for wirelessly or otherwise transmitting and receiving signal as are well known.

Such information, which may include data or instructions to be executed using the processor for example, may be received from and outputted to the network, for example, in the form of a computer data baseband signal or signal embodied in a carrier wave. The baseband signal or signal embodied in the carrier wave generated by the network connectivity devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several well known methods.

The processor executes instructions, codes, computer programs, scripts which it accesses from hard disk, floppy disk, optical disk (these various disk based systems may all be considered secondary storage), ROM, RAM, or the network connectivity devices. Multiple processors may be present. Thus, while instructions may be discussed as executed by a processor, the instructions may be executed simultaneously, serially, or otherwise executed by one or multiple processors.

It will be apparent that various modifications and variations may be made to the embodiments disclosed herein, consistent with the present disclosure, without departing from the spirit and scope of the present disclosure.

While example embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

Further, the foregoing description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

Also, the terms "couple" or "communicate" in any form are intended to mean either a direct connection or indirect connection through some interface, device, intermediate component or connection, whether electrically, mechanically, chemically, or otherwise.

Moreover, all dimensions described herein are intended solely to be by way of example for purposes of illustrating certain embodiments and are not intended to limit the scope of the disclosure to any embodiments that may depart from such dimensions as may be specified.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of a device, area or volume or designated parts thereof.

References in the singular form include the plural and vice versa, unless otherwise noted.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

Certain terms are used throughout to refer to particular components. Manufacturers may refer to a component by different names. It is not intended to distinguish between components that differ in name but not in function.

The purpose of the Abstract is to enable the relevant patent office or the public generally, skill in the art who are not familiar with patent or legal terms or phraseology, to quickly determine from a cursory inspection the nature of the technical disclosure. The Abstract is neither intended to define the scope of this disclosure, which is measured by its claims, nor is it intended to be limiting as to the scope of this disclosure in any way.

In accordance with a first broad aspect of an embodiment of the present disclosure there is provided a slave mobile device including a user-accessible feature, a two way electronic messaging capability, and a slave manager module adapted to decrypt an electronic message received through the electronic messaging capability, the electronic message containing a request, and to manage the user-accessible feature in accordance with the request.

The user-accessible feature can be selected from a group consisting of: a telephone module, an electronic messaging module, a browser module, a game, a multimedia player, a camera, a social networking module, a calendar module, an address book module and a mapping module.

The electronic messaging capability can be selected from a group consisting of: an e-mail function, an SMS messaging function and a PIN messaging function.

The slave manager module can be adapted for managing the user-accessible feature by preventing user access to the feature according to at least one criterion. The at least one criterion can be selected from a group consisting of: date of use, time of day of use, number of times of use, originator and recipient.

The user-accessible feature can be a communications feature and the slave manager module can be adapted to manage the user-accessible feature by controlling the slave device to prevent access to the user-accessible feature when usage limitations for the feature have been reached.

The slave manager module can be further adapted to override usage limitations to permit the user-accessible feature to communicate with authorized persons.

The slave mobile device can be a handset.

The slave manager module can be adapted to pair with a master device to permit encrypted communication between the slave mobile device and the master device through the electronic messaging capability.

The slave manager module can be adapted to pair with the master device utilizing a key exchange protocol to jointly establish a shared secret key over an insecure communications channel.

In accordance with a second broad aspect of an embodiment of the present disclosure there is provided a master device including a two way electronic messaging capability, and a master manager module adapted to generate, encrypt, and transmit an electronic message to a paired slave mobile device, the message being transmitted through the electronic messaging capability and containing a request to manage a user-accessible feature of the slave mobile device in accordance with the request.

In accordance with a third broad aspect of an embodiment of the present disclosure there is provided a method of managing a slave mobile device including decrypting an electronic message received through a two-way electronic messaging capability of the slave mobile device which message contains a request, and managing a user-accessible feature of the slave mobile device in accordance with the request.

The user-accessible feature can be selected from a group consisting of a telephone module, an electronic messaging module, a browser module, a game, a multimedia player, a camera, a social networking module, a calendar module, an address book module and a mapping module.

The electronic messaging capability can be selected from a group consisting of an e-mail function, an SMS messaging function and a PIN messaging function.

The user-accessible feature can be managed by preventing user access to the feature according to at least one criterion.

The at least one criterion can be selected from a group consisting of date of use, time of day of use, number of times of use, originator and recipient.

The user-accessible feature can be a communications feature and a slave manager module manages the user-accessible feature by controlling the slave device to prevent access to the user-accessible feature when usage limitations for the feature have been reached.

The method can further include overriding the usage limitations to permit the user-accessible feature to communicate with authorized persons.

The slave mobile device can be a handset.

The method can further include pairing the slave device with the master device to permit encrypted communication between the slave mobile device and the master device through the electronic messaging capability.

In accordance with a fourth broad aspect of an embodiment of the present disclosure there is provided a system including the slave mobile device of the first broad aspect, and the master device of the second broad aspect.

In accordance with a fifth broad aspect of an embodiment of the present disclosure there is provided a computer program product including a computer readable medium, and computer-readable instructions stored on the computer readable medium, which when operating on a processor of a slave mobile device cause the device to decrypt an electronic message received through a two-way electronic messaging capability of the slave mobile device which message contains a request, and to manage a user-accessible feature of the slave mobile device in accordance with the request.

In accordance with a sixth broad aspect of an embodiment of the present disclosure there is provided a computer program product including a computer readable medium, and computer-readable instructions stored on the computer readable medium, which when operating on a processor of a master device cause the device to generate, encrypt, and transmit an electronic message to a paired slave mobile device, the message being transmitted through the messaging capability and containing a request to manage a user-accessible feature of the slave mobile device in accordance with the request.

In accordance with a seventh broad aspect of an embodiment of the present disclosure there is provided a method including generating and encrypting on a master mobile device an electronic message containing a request to manage a user-accessible feature of a paired slave mobile device in accordance with the request, and transmitting the message to the paired slave mobile device through a two-way electronic messaging capability of the master mobile device.

In accordance with an eighth broad aspect of an embodiment of the present disclosure there is provided a method of operating a mobile device management system, the method including generating and encrypting on a master device an electronic message containing a request to manage a user-accessible feature of a paired slave mobile device in accordance with the request, transmitting the message to the paired slave mobile device through a two-way electronic messaging capability of the master mobile device across an insecure communications channel secured by encrypting the message on the master device, and decrypting an electronic message received through a two-way electronic messaging capability of the slave mobile device which message contains a request received from a paired master device, and managing a user-accessible feature of the slave mobile device in accordance with the request.

Other embodiments consistent with the present disclosure will be apparent from consideration of the specification and the practice of the disclosure disclosed herein.

What is claimed is:

1. A slave mobile device comprising:
a user-accessible communications feature;
a two way electronic messaging capability; and
a non-transitory computer-readable medium having computer-readable instructions stored thereon for execution by a processor, the instructions for implementing a slave manager module capable of:
decrypting at least one of an email, a Short Message Service (SMS) and a Personal Identification Number (PIN) message received through the electronic messaging capability from a paired master device using a secret shared by the slave mobile device and the paired master device, the message including a request,
managing the user-accessible communications feature in accordance with the request by preventing user access to the feature according to at least one criterion comprising reaching a maximum usage limitation, and
overriding the maximum usage limitation to permit the user-accessible communications feature to communicate with authorized persons.

2. The slave mobile device according to claim 1, wherein the user-accessible communications feature is selected from a group consisting of: a telephone module, an electronic messaging module, a browser module, a game, and a social networking module.

3. The slave mobile device according to claim 1, wherein the at least one criterion is selected from a group consisting of: number of times of use and number of minutes of use.

4. The slave mobile device of claim 1 wherein the slave mobile device is a handset.

5. The slave mobile device of claim 1, wherein the slave manager module is capable of pairing with a master device to permit encrypted communication between the slave mobile device and the master device through the electronic messaging capability.

6. The slave mobile device of claim 5, wherein the slave manager module is capable of pairing with the master device utilizing a key exchange protocol to jointly establish a shared secret key over an insecure communications channel.

7. A master device comprising:
a two way electronic messaging capability; and
a non-transitory computer-readable medium having computer-readable instructions stored thereon for execution by a processor, the instructions for implementing a master management module capable of generating, encrypting, and transmitting at least one of an email, Short Message Service (SMS) and Personal Identification Number (PIN) message to a paired slave mobile device, the message being transmitted through the electronic messaging capability and including a request to manage a user-accessible communications feature of the slave mobile device in accordance with the request by preventing user access to the feature according to at least one criterion comprising reaching a maximum usage limitation while permitting the usage limitation to be overridden to permit the user-accessible communications feature to communicate with authorized persons, and being encrypted using a secret shared by the master device and the paired slave device.

8. A method of managing a slave mobile device comprising:
decrypting at least one of an email, Short Message Service (SMS) and a Personal Identification Number (PIN) message received through a two-way electronic messaging capability of the slave mobile device using a secret shared by the slave mobile device and the paired master device, the message including a request from a paired master device; and managing a user-accessible communications feature of the slave mobile device in accordance with the request by preventing user access to the feature according to at least one criterion comprising reaching usage limitations and overriding the maximum usage limitation to permit the user-accessible communications feature to communicate with authorized persons.

9. The method of claim 8, wherein the user-accessible communications feature is selected from a group consisting of: a telephone module, an electronic messaging module, a browser module, a game, and a social networking module.

10. The method of claim 8, wherein the at least one criterion is selected from a group consisting of: number of times of use and number of minutes of use.

11. The method of claim 8, wherein the slave mobile device is a handset.

* * * * *